(12) United States Patent
Smiddy et al.

(10) Patent No.: US 11,098,612 B2
(45) Date of Patent: Aug. 24, 2021

(54) BLADE OUTER AIR SEAL INCLUDING COOLING TRENCH

(71) Applicant: United Technologies Corporation, Farmington, CT (US)

(72) Inventors: Winston Gregory Smiddy, Manchester, CT (US); San Quach, Southington, CT (US); Matthew D. Parekh, Farmington, CT (US); Jeffrey T. Morton, Manchester, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 16/686,609

(22) Filed: Nov. 18, 2019

(65) Prior Publication Data

US 2021/0148247 A1    May 20, 2021

(51) Int. Cl.
*F01D 25/12* (2006.01)
*F01D 11/00* (2006.01)

(52) U.S. Cl.
CPC ............ *F01D 25/12* (2013.01); *F01D 11/005* (2013.01); *F05D 2220/32* (2013.01); *F05D 2240/55* (2013.01); *F05D 2260/221* (2013.01)

(58) Field of Classification Search
CPC ........ F01D 25/12; F01D 11/005; F01D 11/08; F01D 9/04; F01D 11/24; F01D 11/008; F01D 25/24; F01D 5/143; F01D 9/023; F01D 11/006; F05D 2220/32; F05D 2240/11; F05D 2240/55; F05D 2240/57; F05D 2260/201; F05D 2260/202; F05D 2260/221; F04D 29/584; F02C 7/28
See application file for complete search history.

(56) References Cited

U.S. PATENT DOCUMENTS

| | | | |
|---|---|---|---|
| 6,261,053 B1 * | 7/2001 | Anderson | F01D 11/04 415/115 |
| 6,270,311 B1 | 8/2001 | Kuwabara et al. | |
| 6,533,542 B2 | 3/2003 | Sugishita et al. | |
| (Continued) | | | |

FOREIGN PATENT DOCUMENTS

| FR | 2974839 | 11/2012 |
|---|---|---|
| GB | 2356022 | 5/2001 |

OTHER PUBLICATIONS

European Search Report for Application No. 20208190.7 dated Apr. 16, 2021.

*Primary Examiner* — J. Todd Newton
*Assistant Examiner* — Eric J Zamora Alvarez
(74) *Attorney, Agent, or Firm* — Carlson, Gaskey & Olds, P.C.

(57) ABSTRACT

A gas turbine engine includes a compressor, a combustor fluidly connected to the compressor via a core flowpath, and a turbine fluidly connected to the combustor via the core flowpath. The turbine includes at least one stage having a plurality of rotors and a plurality of vanes. An outer diameter of the core flowpath at at least one stage is at least partially defined by a set of circumferentially arranged blade outer air seals. Each blade outer air seal includes a platform. An internal cooling cavity is defined within the platform. At least one mateface of the platform includes a cooling trench, and a first set of cooling holes connecting the internal cavity to the cooling trench.

15 Claims, 4 Drawing Sheets

(56) References Cited

U.S. PATENT DOCUMENTS

| | | | | |
|---|---|---|---|---|
| 7,033,138 B2* | 4/2006 | Tomita | ................. | F01D 11/005 |
| | | | | 415/139 |
| 7,604,453 B2* | 10/2009 | Lee | ....................... | F01D 11/24 |
| | | | | 415/1 |
| 8,287,234 B1 | 10/2012 | Liang | | |
| 8,353,663 B2 | 1/2013 | Arzel et al. | | |
| 8,430,626 B1* | 4/2013 | Liang | ....................... | F02C 7/28 |
| | | | | 415/139 |
| 8,777,559 B2* | 7/2014 | Koyabu | ................. | F01D 11/08 |
| | | | | 415/116 |
| 2001/0005555 A1* | 6/2001 | Kreis | .................... | F01D 11/08 |
| | | | | 428/596 |
| 2005/0067788 A1 | 3/2005 | Liang | | |
| 2014/0047844 A1 | 2/2014 | Teller et al. | | |
| 2017/0284218 A1* | 10/2017 | Kondo | .................... | F01D 9/023 |
| 2018/0238179 A1 | 8/2018 | Quach et al. | | |
| 2018/0238545 A1 | 8/2018 | Quach et al. | | |
| 2018/0238547 A1 | 8/2018 | Quach et al. | | |
| 2018/0335211 A1 | 11/2018 | Quach et al. | | |

* cited by examiner

BLADE OUTER AIR SEAL INCLUDING COOLING TRENCH

TECHNICAL FIELD

The present disclosure relates generally to gas turbine engine cooling configurations, and more specifically to a blade outer air seal including a cooling trench.

BACKGROUND

Gas turbine engines, such as those utilized in commercial and military aircraft, include a compressor section that compresses air, a combustor section in which the compressed air is mixed with a fuel and ignited, and a turbine section across which the resultant combustion products are expanded. The expansion of the combustion products drives the turbine section to rotate. As the turbine section is connected to the compressor section via a shaft, the rotation of the turbine section further drives the compressor section to rotate. In some examples, a fan is also connected to the shaft and is driven to rotate via rotation of the turbine as well.

Within the gas turbine engine are multiple stages, with each stage including rotors that rotate about an axis. The rotors extend radially outward into a flowpath, and the flowpath is closed outward of the rotor tips via circumferentially arranges blade outer air seals. Due to the extreme thermal range within a gas turbine engine, cooling systems are employed within the blade outer air seals in order to minimize and delay thermal degradation of the blade outer air seals.

SUMMARY OF THE INVENTION

In one example, a gaspath component for a gas turbine engine includes a platform partially defining an outer diameter of a core flowpath while the gaspath component is in an installed configuration, an internal cooling cavity defined within the platform, at least one mateface of the platform including a cooling trench, and a first set of cooling holes connecting the internal cavity to the cooling trench.

In another example of the above gaspath component, the gaspath component is a blade outer air seal.

In another example of any of the above gaspath components, the at least one mateface of the platform is a circumferentially leading edge of the platform, and wherein the cooling trench is at a radially innermost portion of the circumferentially leading edge.

In another example of any of the above gaspath components, the at least one mateface of the platform includes a circumferentially leading edge and a circumferentially trailing edge of the platform, and wherein each of the cooling trenches is at a radially innermost portion of the corresponding circumferentially leading edge and the corresponding circumferentially trailing edge of the platform.

In another example of any of the above gaspath components, the cooling trench extends a full axial length of the at least one mateface.

In another example of any of the above gaspath components, the cooling trench extends a partial axial length of the at least one mateface.

In another example of any of the above gaspath components, the at least one mateface includes a mateface trench radially outward of the cooling trench.

Another example of any of the above gaspath components includes a second set of cooling holes connecting the internal cooling compartment to the mateface trench.

In another example of any of the above gaspath components, a quantity of cooling holes in the first set of cooling holes is the same as a quantity of cooling holes in the second set of cooling holes.

In another example of any of the above gaspath components, a quantity of cooling holes in the first set of cooling holes is distinct from a quantity of cooling holes in the second set of cooling holes.

In another example of any of the above gaspath components, the trench is a chamfered intrusion.

In another example, a gas turbine engine includes a compressor, a combustor fluidly connected to the compressor via a core flowpath, a turbine fluidly connected to the combustor via the core flowpath, the turbine including at least one stage having a plurality of rotors and a plurality of vanes, and an outer diameter of the core flowpath at at least one stage being at least partially defined by a set of circumferentially arranged blade outer air seals, each blade outer air seal including a platform, an internal cooling cavity defined within the platform, at least one mateface of the platform including a cooling trench, and a first set of cooling holes connecting the internal cavity to the cooling trench.

Another example of the above described gas turbine engine includes a plurality of mateface gaps, each mateface gap being defined between circumferentially adjacent blade outer air seals and being sealed by an intersegment seal.

In another example of any of the above described gas turbine engines each cooling trench is radially inward of a corresponding intersegment seal.

In another example of any of the above described gas turbine engines each blade outer air seal includes an identical cooling trench configuration.

In another example of any of the above described gas turbine engines at least one blade outer air seal in the set of circumferentially arranged blade outer air seals includes a distinct cooling trench configuration from at least one other blade outer air seal in the set of circumferentially arranged blade outer air seals.

In another example of any of the above described gas turbine engines the at least one mateface of the platform is a circumferentially leading edge of the platform, and wherein the cooling trench is at a radially innermost portion of the circumferentially leading edge.

In another example of any of the above described gas turbine engines the at least one mateface of the platform includes a circumferentially leading edge and a circumferentially trailing edge of the platform, and wherein each of the cooling trenches is at a radially innermost portion of the corresponding circumferentially leading edge and the corresponding circumferentially trailing edge of the platform.

In another example of any of the above described gas turbine engines each cooling trench extends a full axial length of the at least one mateface.

An exemplary method for improving cooling of a blade outer air seal includes connecting a mateface cooling trench of a blade outer air seal to an internal cooling cavity of the blade outer air seal via at least one set of cooling holes.

These and other features of the present invention can be best understood from the following specification and drawings, the following of which is a brief description.

DETAILED DESCRIPTION

Figure 1:
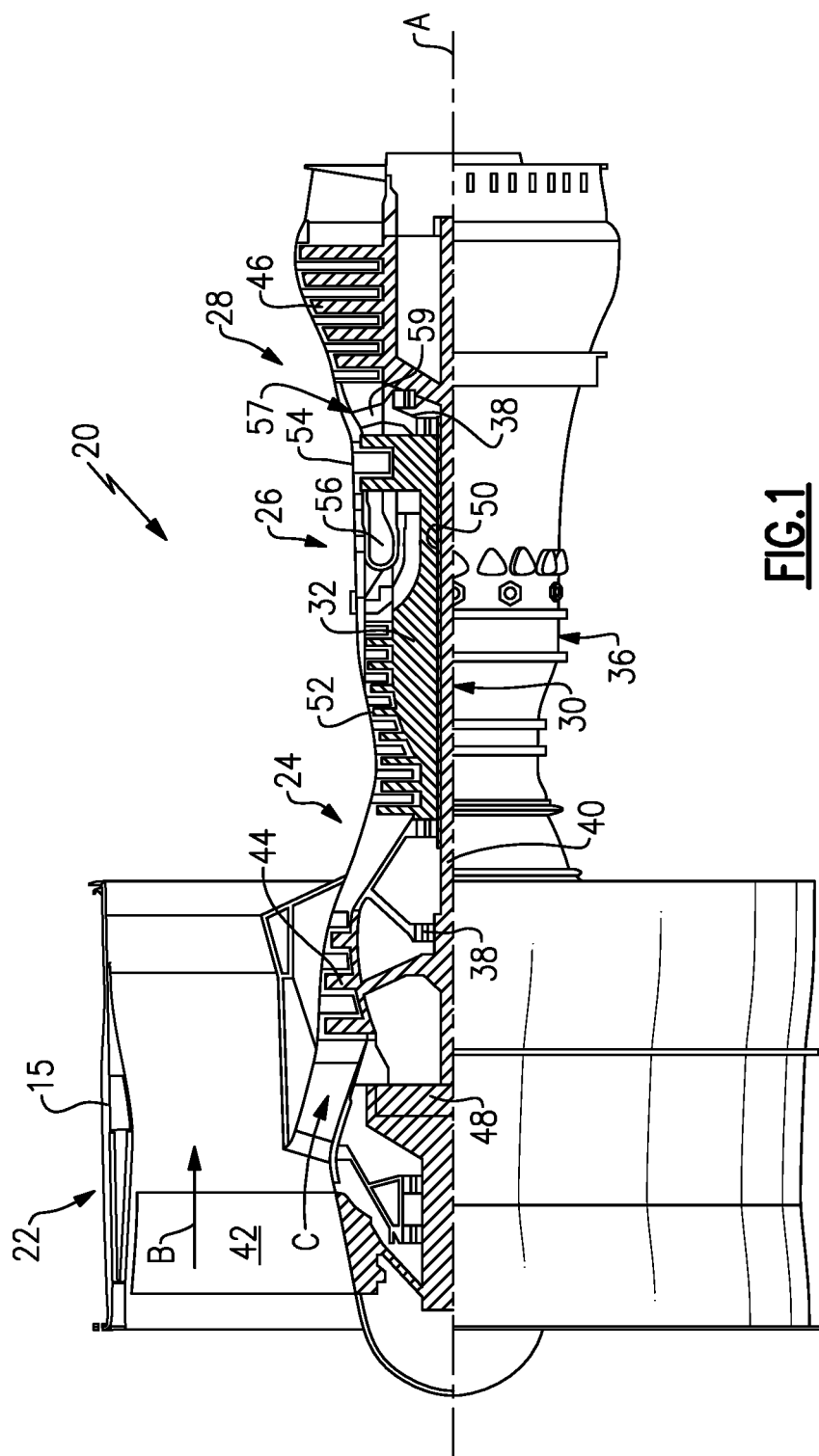
FIG. 1 illustrates an exemplary gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second (350.5 meters/second).

Figure 2:
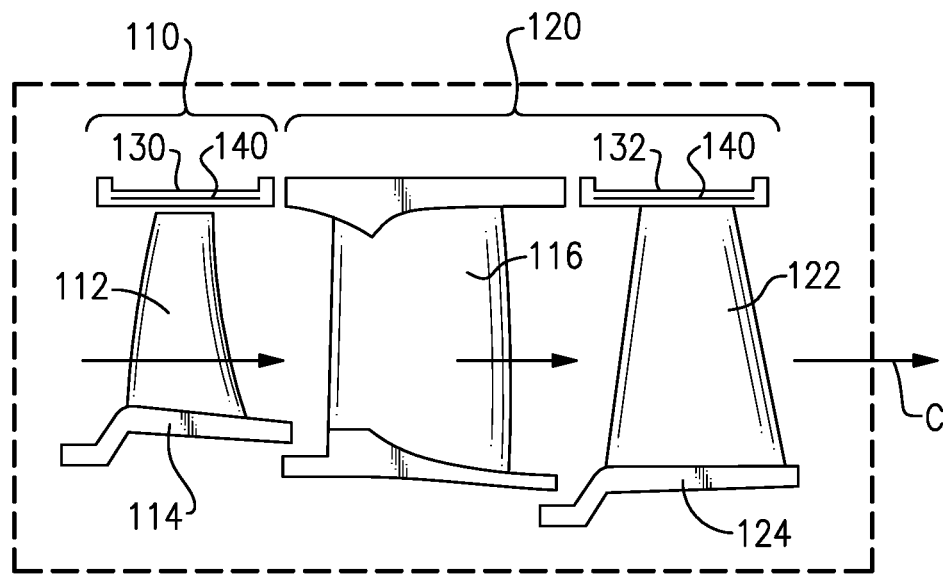
FIG. 2 schematically illustrates a partial turbine section of the gas turbine engine of FIG. 1.
Figure 3:
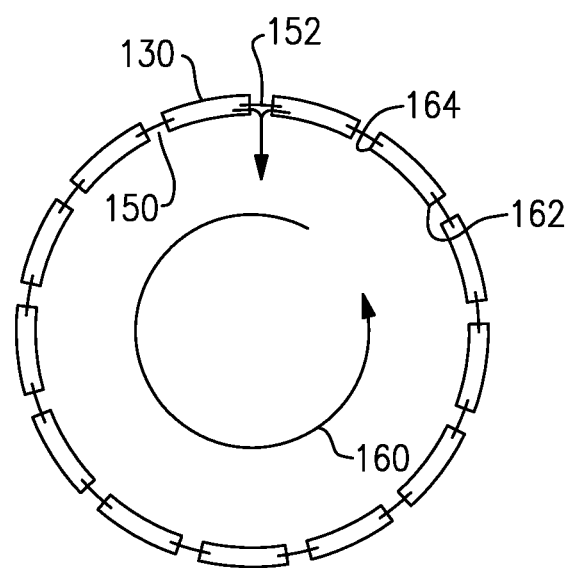
FIG. 3 schematically illustrates an axial view of a circumferential blade outer air seal arrangement.

With continued reference to FIG. 1, FIG. 2 schematically illustrates a portion of the turbine section 28 including a portion of a first stage 110, and a second stage 120. Each stage 110, 120 includes a rotor blade 112, 122 extending from a radially inward platform 114, 124 into a core flow path C. The rotor blades 112, 122 are fixed to one of the shafts 40, 50 (illustrated in FIG. 1), and drive the shaft to rotate. Upstream of each rotor 112, 122, within a stage 110, 120, is a static vane 116 (not illustrated for the first stage 110). The static vane 116 is fixed relative to the engine static structure 36, and does not rotate. The static vane operates to impart flow correction on the fluid flowing through the core flow path C before the fluid is passed to the rotor blade 112, 122. The core flowpath C is defined radially outward of the rotors 112, 122 by a set of circumferentially arranged blade outer air seals 130, 132. Each of the blade outer air seals 130, 132 includes a platform defining a portion of the outer diameter of the core flowpath and multiple connection features, such as retaining hooks, for fixing the blade outer air seal 130, 132 in position relative to an engine static structure 36. Due to the heat of the combustion products being expanded across the turbine section, the blade outer air seals 130, 132 include internal cooling compartments 140, and air is provided from radially outward of the core flow path C into the cooling compartments 140. Even with the inclusion of the internal cooling compartments 140, some portions of the blade outer air seals 130, 132 are more susceptible to thermal degradation than other portions. By way of example, a radially inward circumferential leading edge corner is highly susceptible to thermal degradation in some engine designs. With continued reference to FIGS. 1 and 2, FIG. 3 schematically illustrates a circumferential configuration of blade outer air seals 130. Defined between each blade outer air seal 130 and each adjacent blade outer air seal 130 within the circumferential configuration is a mateface gap 150. A radially outward portion of each mateface gap 150 is sealed via an intersegment seal 152. In some examples, the intersegment seals 152 are featherseals. In alternative examples, the intersegment seals 152 can be any other seal configuration able to prevent flow of a fluid in the radial direction. During operation of the gas turbine engine, cooling air within the internal cooling compartment is expelled from the blade outer air seals 130 into the core flow path C and exhausted from the engine.

The rotational direction of the rotor blades 112, 122 radially inward of the blade outer air seals 130 is indicated via a directional arrow 160. As utilized herein the term "circumferential leading edge" refers to an axially aligned edge 162 of each blade outer air seal 130 first encountered by a rotating blade and "circumferential trailing edge" refers to an axially aligned edge 164 of the blade outer air seal 130 last encountered by the rotating blade, with the axis being an axis of rotation of the blades.

With continued reference to FIGS. 1-3, FIG. 4 schematically illustrates a mateface gap 310 between two circumferentially adjacent blade outer air seals 312, 314. The second blade outer air seal 314 includes a trench 320 at the radially inward portion of the circumferentially leading edge 322. The trench 320 is a chamfered intrusion into the blade outer air seal 314. In alternative examples, the trench 320 can be angled, or any other geometric intrusion along the circumferential edge. The particular geometry can be selected determined based on trade offs between the manufacturing difficulty and cooling capabilities according to known procedures in the art.

An internal cooling cavity 330 is connected to the trench 320 via a set of first cooling holes 332 and a set of second cooling holes 334. A third set of cooling holes 336 connects the internal cavity 330 to a radially inward facing surface 340 of the blade outer air seal 314. In some examples, each of the first, second and third set of cooling holes 332, 334, 336 includes the same number of cooling holes 332, 334, 336. In alternative examples one or more of the sets of cooling holes 332, 334, 336 may have a different number of cooling holes from the remainder of cooling hole sets, with the specific numbers and locations of cooling holes in each set 332, 334, 336 being determined according to the specific cooling requirements of the gas turbine engine.

Figure 4:
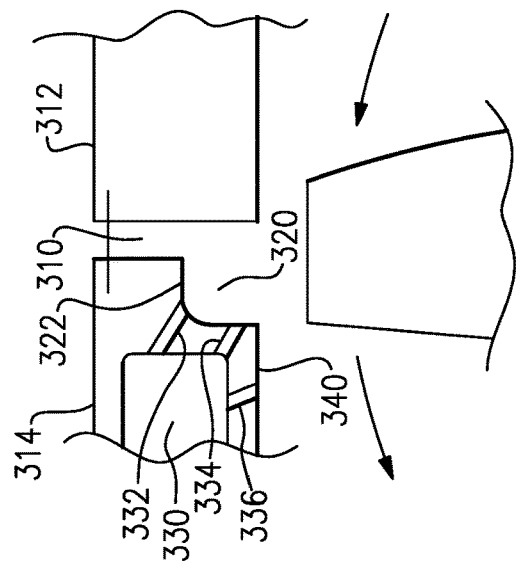
FIG. 4 schematically illustrates a first exemplary blade outer air seal cooling trench configuration.

In the example of FIG. 4, the circumferentially leading edge trench 320 is cooled at the radially outer portions via the first set of cooling holes 332, and at a radially inward portion via the second set of cooling holes 334.

With reference again to FIGS. 1-3, FIG. 5 schematically illustrates an alternate configuration including two circumferential edge trenches 420, 422 in a leading edge circumferential edge of a blade outer air seal 414. The first circumferential edge trench 420 is disposed at a radially innermost portion of the blade outer air seal 414, and the second trench 422 is disposed at an intermediate portion of a circumferentially leading edge. Each of the trenches 420, 422 is connected to an internal cooling cavity 430, via a corresponding set of film cooling holes 432, 434, and a third set of film cooling holes 436 connects the internal cooling cavity 430 to a radially inward facing surface 440.

In addition to the first and second circumferentially leading edge trenches 420, 422, the circumferentially trailing edge 450 of the blade outer air seals 414, 412 include a set of cooling holes connecting the internal cavity 431 to the mateface gap, providing cooling to the circumferentially trailing edge 450.

With continued reference to FIGS. 1-4, FIG. 6 illustrates a configuration where the circumferentially leading edge trench 520 and cooling holes 532, 534, 536 are configured substantially identical to the trench 320 configuration of FIG. 4, with a variation in the geometry of the trench 520. In addition, each of the blade outer air seals 514, 512 includes a trailing edge trench 560, the trailing edge trench 560 is a geometric intrusion into the blade outer air seal 512. In alternative examples, the trench can be angled, or any other geometric intrusion along the circumferential edge. The particular geometry can be selected determined based on trade offs between the manufacturing difficulty and cooling capabilities according to known procedures in the art.

Figure 6:
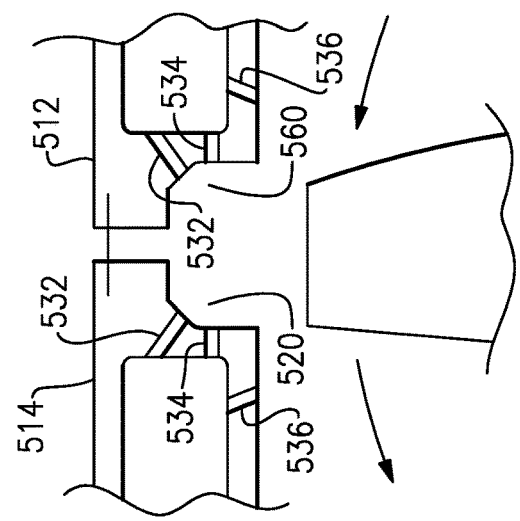
FIG. 6 schematically illustrates an exemplary blade outer air seal leading edge and trailing edge cooling trench configuration.
Figure 5:
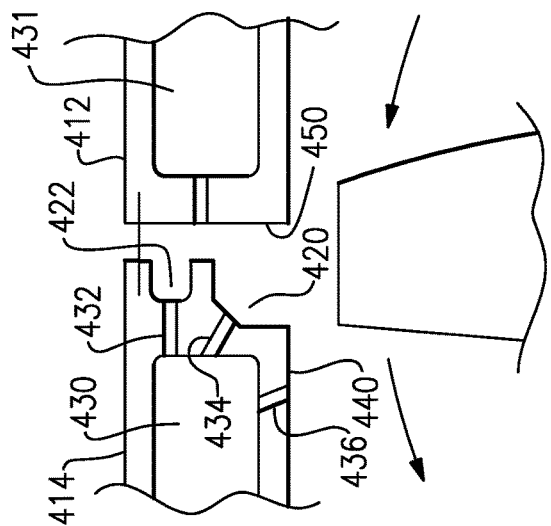
FIG. 5 schematically illustrates a second exemplary blade outer air seal cooling trench configuration.
Figure 7:
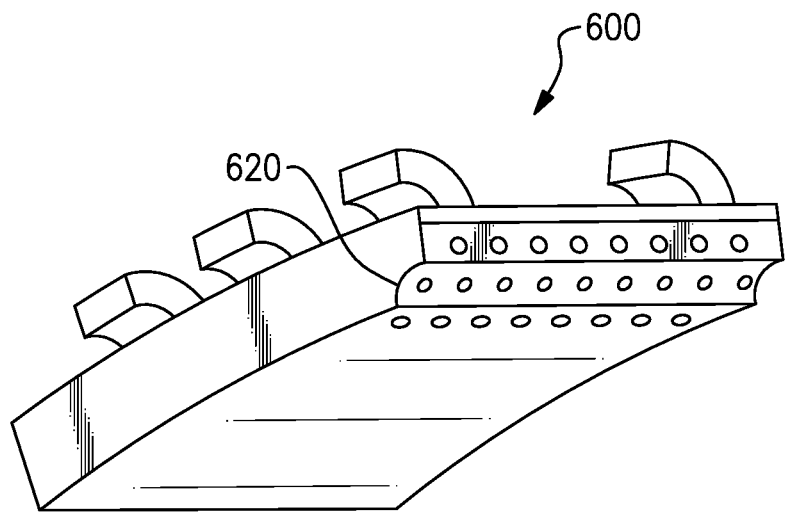
FIG. 7 isometrically illustrates a schematic blade outer air seal including a full axial length cooling trench.
Figure 8:
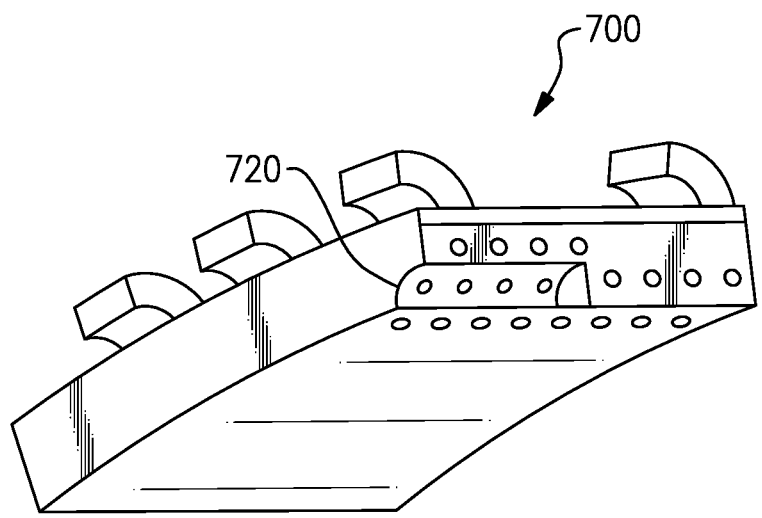
FIG. 8 isometrically illustrates a schematic blade outer air seal including a partial axial length cooling trench.

With reference to all of FIGS. 4-6, the utilization of the circumferential edge trenches maintains the outer air seal functionality of the blade outer air seals, while increasing the ability to cool the circumferential edge corners, thereby reducing the thermal stresses experienced at the circumferential edges. In some examples, such as the example illustrated in FIG. 7, each of the circumferential edge trenches 620 extends a full axial length of the blade outer air seal 600. In alternative examples, such as the example illustrated in FIG. 8, the circumferential edge trenches 720 extend only a partial axial length of the blade outer air seal 700. Further, it is appreciated that, depending on the particular cooling needs of any given engine, the axial length of a partial circumferential edge trench can be of any suitable length. While illustrated in the examples of FIGS. 7 and 8 as being positioned on a circumferential leading edge of the blade outer air seal 600, 700, it is appreciated that the circumferential trailing edge of the blade outer air seals 600, 700 can similarly include full length axial trenches and partial length axial trenches.

With illustrated above, in FIGS. 1-8 as discrete example configurations for blade outer air seals, it is appreciated that any given stage can include multiple blade outer air seal designs within the circumferential configuration and the blade outer air seals are not required to be uniform, nor are the designs disclosed herein mutually exclusive within a single circumferential configuration.

It is further appreciated that any internal cooling cavity configuration including a single large cavity, a network of serpentine cavities, multiple disconnected cavities, or any other internal cooling configuration. Further, while described within the specific context of a blade outer air seal, it is appreciated that the mateface cooling trench configuration can be applied similarly configured flowpath components, and is not limited in application to blade outer air seals.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gaspath component for a gas turbine engine comprising:
   a platform partially defining an outer diameter of a core flowpath while the gaspath component is in an installed configuration;
   an internal cooling cavity defined within the platform;
   at least one mateface of the platform including a cooling trench defined at least in part by a radially aligned wall, an axially aligned wall, and a wall portion transitioning from the radially aligned wall to the axially aligned wall;
   a first set of cooling holes and a second set of cooling holes connecting the internal cooling cavity to the cooling trench; and
   the second set of cooling holes connects the internal cooling cavity to the radially aligned wall of the gaspath component and the first set of cooling holes connects the internal cooling cavity to a portion of the cooling trench transitioning from the radially aligned wall of the cooling trench to the axially aligned wall of the cooling trench.

2. The gaspath component of claim 1, wherein the gaspath component is a blade outer air seal.

3. The gaspath component of claim 1, wherein the at least one mateface of the platform is a circumferentially leading edge of the platform, and wherein the cooling trench is at a radially innermost portion of the circumferentially leading edge.

4. The gaspath component of claim 1, wherein the at least one mateface of the platform includes a circumferentially leading edge and a circumferentially trailing edge of the platform, and wherein each of the cooling trenches is at a radially innermost portion of the corresponding circumferentially leading edge and the corresponding circumferentially trailing edge of the platform.

5. The gaspath component of claim 1, wherein the cooling trench extends a full axial length of the at least one mateface.

6. The gaspath component of claim 1, wherein the cooling trench extends a partial axial length of the at least one mateface.

7. The gaspath component of claim 1, wherein the trench is a chamfered intrusion.

8. A gas turbine engine comprising:
   a compressor;
   a combustor fluidly connected to the compressor via a core flowpath;
   a turbine fluidly connected to the combustor via the core flowpath, the turbine including at least one stage having a plurality of rotor blades and a plurality of vanes; and
   an outer diameter of the core flowpath at least one stage being at least partially defined by a set of circumferentially arranged blade outer air seals, each blade outer air seal including a platform, an internal cooling cavity defined within the platform, at least one mateface of the platform including a cooling trench defined at least in part by a radially aligned wall, an axially aligned wall, and a wall portion transitioning from the radially aligned wall to the axially aligned wall, and a first set of cooling holes and a second set of cooling holes connecting the internal cooling cavity to the cooling trench; and
   the second set of cooling holes connects the internal cooling cavity to the radially aligned wall and the first set of cooling holes connects the internal cooling cavity to the wall portion transitioning from the radially aligned wall to the axially aligned wall.

9. The gas turbine engine of claim 8, wherein each blade outer air seal includes an identical cooling trench configuration.

10. The gas turbine engine of claim 8, wherein the at least one mateface of each platform is a circumferentially leading edge of the platform, and wherein each cooling trench is at a radially innermost portion of the circumferentially leading edge.

11. A gas turbine engine comprising:
    a compressor;
    a combustor fluidly connected to the compressor via a core flowpath;
    a turbine fluidly connected to the combustor via the core flowpath, the turbine including at least one stage having a plurality of rotor blades and a plurality of vanes; and
    an outer diameter of the core flowpath at at least one stage being at least partially defined by a set of circumferentially arranged blade outer air seals, each blade outer air seal including a platform, an internal cooling cavity defined within the platform, at least one mateface of the platform including a cooling trench, and a first set of cooling holes connecting the internal cooling cavity to the cooling trench; and
    at least one blade outer air seal in the set of circumferentially arranged blade outer air seals includes a distinct cooling trench configuration from at least one other blade outer air seal in the set of circumferentially arranged blade outer air seals.

12. The gas turbine engine of claim 11, further comprising a plurality of mateface gaps, each mateface gap being defined between circumferentially adjacent blade outer air seals and being sealed by an intersegment seal.

13. The gas turbine engine of claim 12, wherein each cooling trench is radially inward of a corresponding intersegment seal.

14. The gas turbine engine of claim 11, wherein the at least one mateface of the platform includes a circumferentially leading edge and a circumferentially trailing edge of the platform, and wherein each of the cooling trenches is at a radially innermost portion of the corresponding circumferentially leading edge and the corresponding circumferentially trailing edge of the platform.

15. The gas turbine engine of claim 11, wherein each cooling trench extends a full axial length of the at least one mateface.

* * * * *